United States Patent [19]

Morrell et al.

[11] 3,846,594

[45] Nov. 5, 1974

[54] COIN TELEPHONE WITH SEPARATE COSMETICALLY ATTRACTIVE COVER

[75] Inventors: Ronald Joseph Morrell; Joseph Thompson; Raymond Charles Hemming; Henry Allan Main, all of London, Ontario, Canada

[73] Assignee: Northern Electric Company Limited, Montreal, Quebec, Canada

[22] Filed: Oct. 26, 1972

[21] Appl. No.: 301,093

[52] U.S. Cl. .............................. 179/179, 179/6.3 R

[51] Int. Cl. .............................. H04m 1/02

[58] Field of Search ...... 179/179, 6.3 R, 184, 189 R

[56] References Cited

UNITED STATES PATENTS

| | | | |
|---|---|---|---|
| 2,473,775 | 6/1949 | Allen et al. | 179/179 |
| 3,213,210 | 10/1965 | Samples | 179/189 R |
| 3,258,535 | 6/1966 | Nawman | 179/6.3 R |
| 3,260,338 | 7/1966 | LaBarge | 179/6.3 R X |
| 3,393,273 | 7/1968 | Bustos | 179/6.3 R |

OTHER PUBLICATIONS

GTE Automatic Electric Technical Journal, Vol. 13, No. 1, (Jan. 1972), pp. 2–4.

*Primary Examiner*—Thomas W. Brown
*Attorney, Agent, or Firm*—Sidney T. Jelly

[57] ABSTRACT

A coin telephone unit is provided with two covers -an inner strong intruder resistant cover and an outer lightweight cosmetically attractive cover. The inner cover can be painted an attention drawing colour. The inner cover does not need replacing if damaged during an attempt to remove it. The inner cover can be more easily and cheaply made as only strength and not appearance need be considered. Damage to or wear of the outer cover requires only replacing of relatively cheap outer cover.

3 Claims, 11 Drawing Figures

PATENTED NOV 5 1974 SHEET 1 OF 5 3,846,594

COIN TELEPHONE WITH SEPARATE COSMETICALLY ATTRACTIVE COVER

This invention relates to coin telephone units, and in particular to the covers for such units, the covers protecting and covering the coin mechanism and other parts.

Coin telephones are the target for considerable vandalism. Telephone companies spend considerable time and money maintaining the apparatus in working condition, replacing damaged units. To protect the apparatus and to prevent theft of the money from the unit, the apparatus is housed in a strong housing and also a very strong metal cover is fastened over the apparatus. At the same time it is desired to make the apparatus look as attractive as possible. These two requirements are often in opposition in that the strongest and least vulnerable form of protective housing and cover is not usually attractive.

After an attempt to break into an apparatus, it is usually necessary to replace at least the protective cover as the damage makes the appearance unattractive. Also it is desirable to replace a damaged cover by an undamaged one so that further attempts to break open the apparatus will be noticeable. Because of the need for the housing and cover to be strong and also at least have some degree of attractive appearance, they are expensive. Thus the maintenance of coin telephones is expensive in areas of high vandalism, and cost of maintenance can make the provision of coin telephones uneconomic.

The present invention provides for covering the telephone apparatus with two covers, an intruder resistant inner cover, which cooperates with the strong housing, and a cosmetically attractive outer cover. Conveniently the outer cover is moulded from a plastic material -such as a synthetic resin, or a metal pressing or stamping.

The outer cover is easily and cheaply formed to an attractive shape and can have colour and form variations. As neither the inner cover nor the housing is seen, costly finishing operations can be avoided and can be made by the most effective methods, without restriction as to size and position of welds for example. The outer cover may be damaged, or removed but removal is immediately conspicuous and will be very obvious. This can act as a deterrent. These and other advantages will be quite clear from the following description of one particular arrangement, by way of example, in conjunction with the accompanying drawings, in which:

Figure 11:
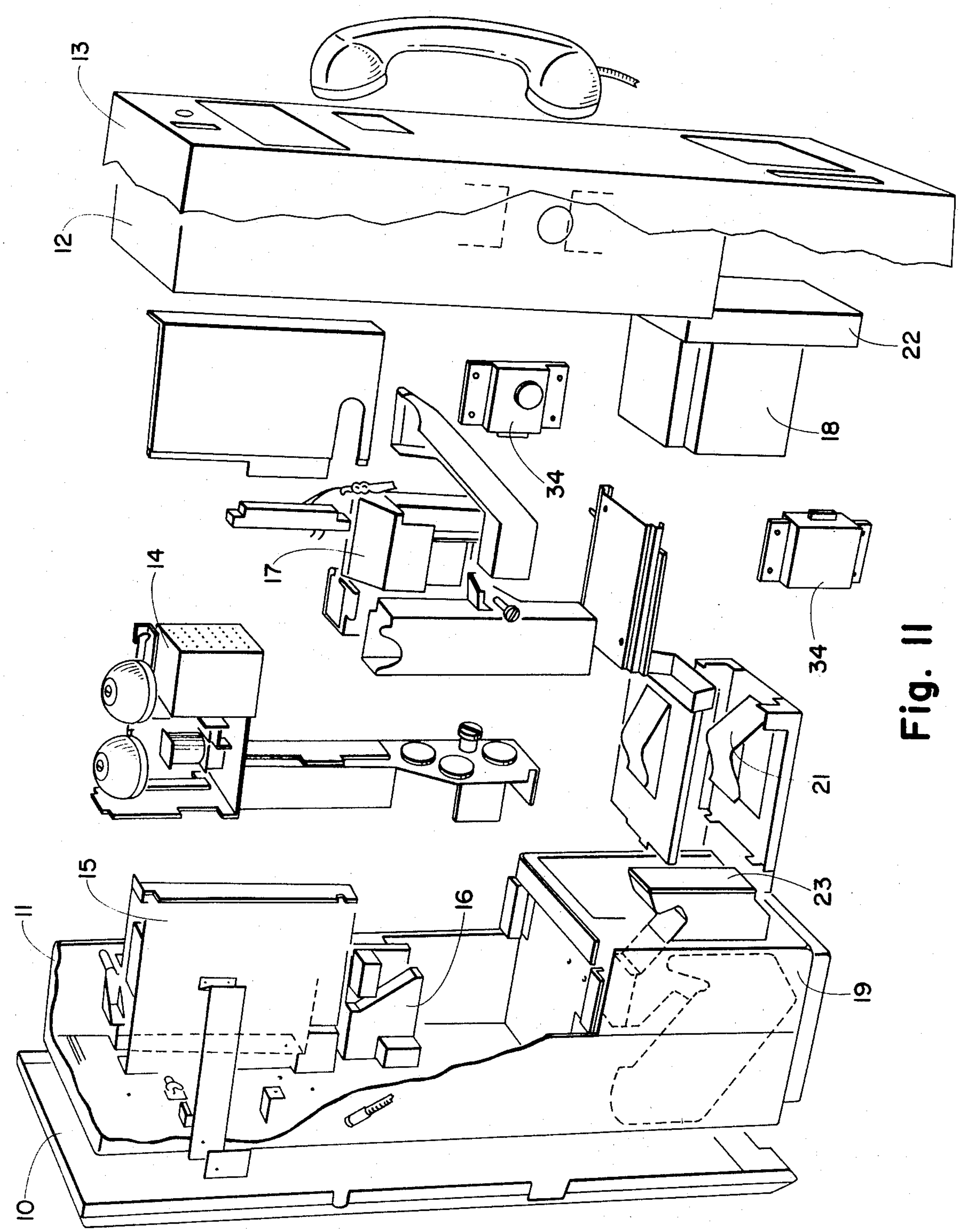
FIG. 11 is an exploded view of the various details of a unit as in FIGS. 1 to 6.

As seen in the drawings, and particularly in FIG. 11, the unit comprises a plurality of parts:- a back plate or pan 10; a housing 11; an intruder resistant inner cover 12; and an outer cover 13. The housing 11 is of very strong construction and is attached very securely to a supporting structure —not shown— for example a telephone booth.

Housed partially or wholly within housing 11 are the usual items extant to a telephone unit, for example the bell unit 14; coin chute 15; coin switch module 16; coin relay and hopper unit 17. At the lower part of the housing it extends to form a container for the coin receptacle 18 (FIG. 11). The extension 19 is conveniently formed separately and attached to the housing 11 by welding. Housing 11 and extension 19 are of heavy gauge steel plate. Formed in the front of the housing extension 19 is an opening 20 through which the coin receptacle 18 can be inserted and withdrawn, the receptacle being held in position by a spring 21. The opening 20 is closed by a door 22 which fits closely in the opening, is of strong construction and does not have any protrusions by which it can be wrenched or levered from the housing. A lock is provided for retaining the door in the opening, a key being inserted at 22 for door removal. Alongside the opening 20 is provided a returned coin access 23.

The various items referred to above as being housed in the housing 11 are the usual items present in a telephone unit and do not need to be described in detail. Other items not specifically related are also present -again being the normal parts of a telephone unit.

The housing 11 is closed by the inner cover 12. Inner cover 12 is of heavy gauge steel sheet formed to present as smooth and protrusion free form as possible. Where the inner cover 12 mates with the housing 11 it is a very close fit. The rear periphery of the cover fits inside the front periphery of the housing and does not provide any purchase for a lever or wrench, or similar tool, which might be used in an attempt to remove the inner cover forcibly. The front face of the inner cover has mounted thereon a dial 30 and also the phone hook 31. At the top of the cover is the coin inlet 32 and the coin return button 33. The inner cover 12 is retained in position by a lock 34 operating retaining mechanisms 35, one on each side of the cover. The lower edge of the inner cover butts closely against the top surface of the housing extension 19.

The retaining mechanisms 35 are necessarily attached to the cover as strongly as possible. Conveniently the mechanisms 35 move on mounting points which are spot welded to the cover. It is also desirable to ensure that the attachment of other items to the housing 11 are strong and again this is conveniently obtained by spot welding. However, to ensure a sound and effective spot weld some dimpling or depression of the housing and cover will occur, on the outer surfaces. In conventional coin telephones this outer surface shows. To improve the appearance of conventional telephones two steps are usually taken to improve the appearance of the outer surface:- firstly the spot welds are not made so strongly to reduce dimpling, and secondly the outer surfaces are machined to give a smooth surface. Reduction in the spot weld strength is not desirable and can result in faulty welds. Machining the outer surfaces is expensive.

By providing an outer cover, spot welds can be made as strong as possible as dimples to depressions, as indicated at 36 for example, will not be seen once the outer cover is on. Thus a stronger and cheaper unit is produced. Also, weld-nuts are used to provide threaded attachment positions. These can be attached on the outside of the inner cover as seen at 37. This is more satisfactory in that on tightening screws into the nuts, the nuts are pulled into engagement with the cover, rather than tend to be pulled away as would be the case with nuts welded on the inside.

By having an outer cover which is esthetically pleasing, it is possible to avoid adding expensive trim pieces to a telephone to improve its appearance. Thus in some instances a chromium-plated casting is attached to the front of the cover to improve the appearance and to cover up some features which unavoidably show -such as screw heads and the like. Such an item is very expensive.

The outer cover of the present invention enables windows, as shown at 40 and 41, for display of notices and operating instructions, to be provided which are inserted from the rear. They are less liable to damage and removal than in many conventional telephones where the notices are inserted from the front.

Thus the unit, with the housing 11; the extension 19; door 22 and inner cover 12, form when closed, and extremely strong and intruder resistant container for the apparatus and coin box or receptacle. The housing extension 19 can be formed as part of the inner cover 12 if desired. However with the arrangement illustrated and described, even if the inner cover was eventually removed by force no access is provided to the coin receptacle. The whole assembly —housing and inner cover— can be made in a manner which need only take into consideration strength and resistance to force, unconcerned with appearance. As a further deterrent to thieves, the housing 11, extension 19 and inner cover 12 are painted a bright colour, for example a fluorescent orange, which is very obvious if the outer cover is removed. This prevents inconspicuous lock-picking.

The outer cover 13, in the present example, is moulded in a plastics material. It completely encloses the inner cover 12 and the housing 11 with its extension 19. Holes are provided through which project the dial 30 and hook 31, and the coin return button 33. Holes also provide access to the coin inlet 32 and the return coin access 23. The outer cover is smooth and, in the present example, given an attractive textured finish on its outer surface. For normal use in pay telephone booths it is usually black in colour, but outer covers of various colours can readily be provided. Thus telephones in places such as hotel lobbies, restaurants and the like can be provided with an outer cover which blends with the surrounding decor. It is also possible to provide variations in appearance. The cover cooperates with the back plate or pan 10. This is a relatively light-weight pressing or moulding to match the outer cover to provide an attractive assembly.

The outer cover provides for an attractive appearance to the telephone unit. This has not been a feature of such units previously as the necessity of providing a strong intruder resistant housing and cover has meant that some compromise has been necessary. As a result pay telephones have not been of good appearance. The only way to obtain variations in colour has been by painting the covers, and this is not ideal as the finish marks easily.

In the event of any damage to a conventional telephone, it is normal to replace the whole unit. This is because certain items of the unit are mounted on the cover and it is at least inconvenient to have to disassemble and reassemble the unit at the installation position. The removed unit is then returned for refurbishing, which is expensive. Even without damage, it becomes necessary to replace telephones from time to time as the painted surface wears. The paint is only a surface coating and eventually is worn away at certain places —for instance by rubbing of the telephone cord. The paint surface also becomes discoloured —for example around the dial and coin insert. With the present invention, the outer cover can be moulded from a plastic material having colour all the way through which avoids wear and can be resistant to discolouration. Also minor scratches will not show. When necessary to replace the cover, the inner unit is not touched. Thus replacement costs are very much reduced, as the cost of an outer cover is a fraction of the cost of removing and refurbishing a complete unit.

If the outer cover is illegally removed this is immediately obvious because of the difference of appearance. This can be further enhanced by painting the housing and inner cover a distinctive colour, such as orange. This prevents inconspicuous lock-picking. In such removal of the outer cover, repair is easy and cheap in that only a new outer cover is needed. The outer cover also discourages petty vandalism such as blocking locks by matchsticks and other foreign material. It also improves the exclusion of dust, and water in exposed sites.

The outer cover is attached by interengaging formations at the bottom of the outer cover and extension 19 and by a lock 42 at the top. The lock 42 is seen more clearly in FIGS. 7, 8 and 9. As the housing and inner cover are heavy pressings and the outer cover is a moulding, it is desirable to provide for some degree of variation in size. Thus it is desirable that the lock 42 should accept a certain amount of misalignment of the interengaging parts. If this is done, wider manufacturing limits can be applied to the housing and inner cover, and to the outer cover, reducing costs. The lock 42 is also desirably thin to avoid any local thickening of the outer cover.

Figures 1, 2:
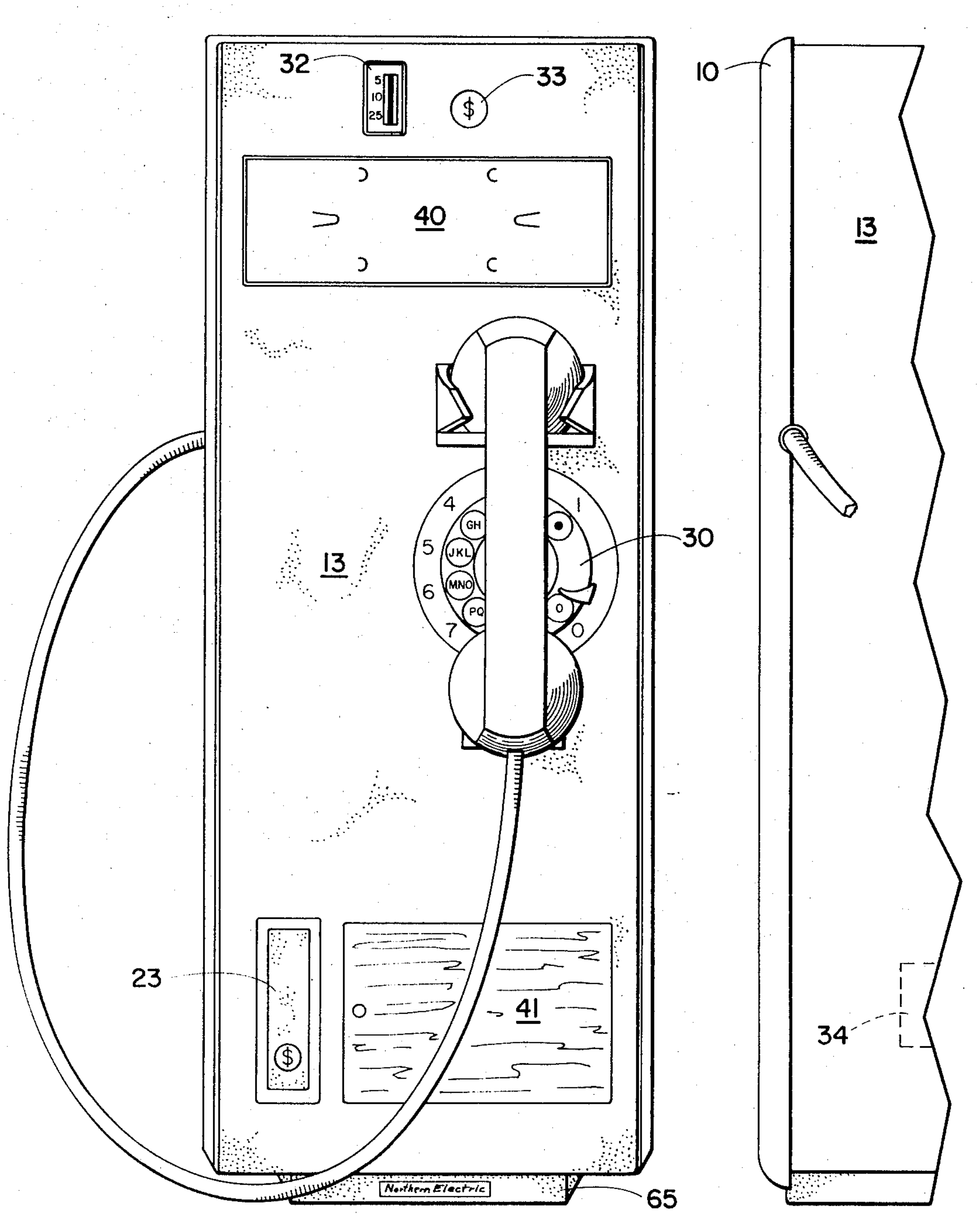
FIG. 1 is a front view of a telephone unit completely assembled.
FIG. 2 is a side view of the unit of FIG. 1.
Figure 3:
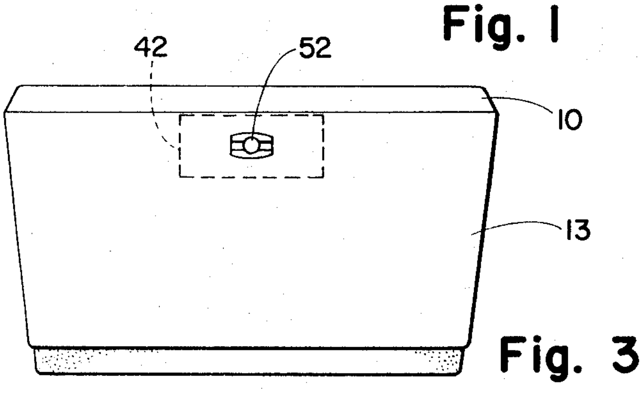
FIG. 3 is a top view of the unit of FIG. 1.
Figure 4:
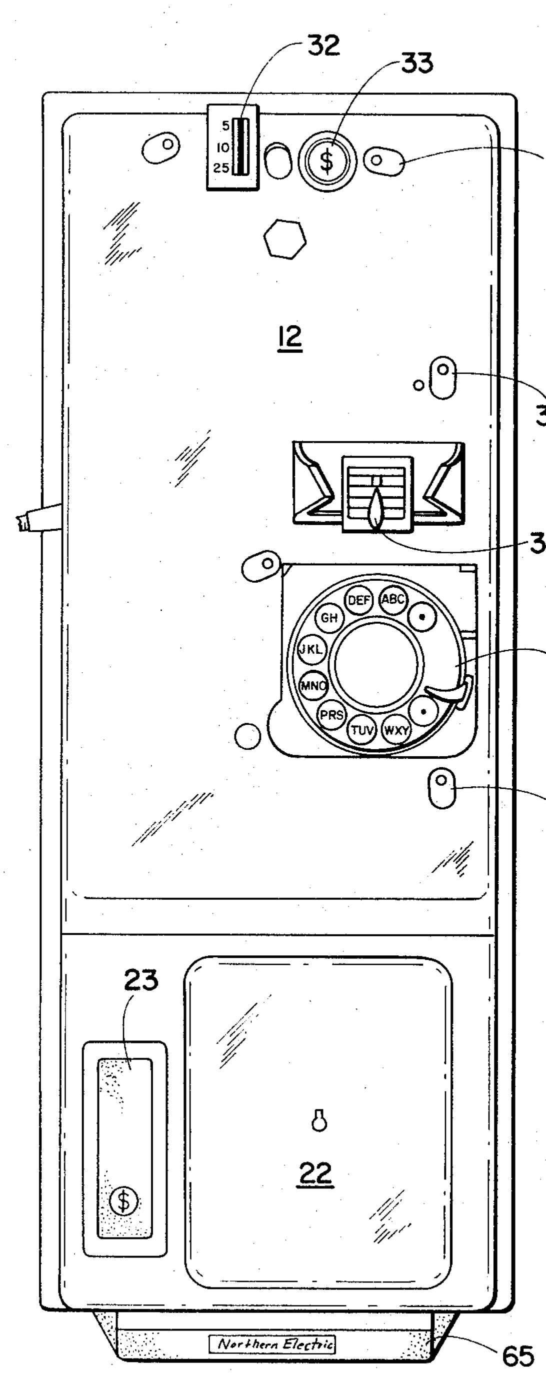
FIG. 4 is a front view of the unit of FIG. 1 with the outer cover removed showing inner intruder resistant cover.
Figure 5:
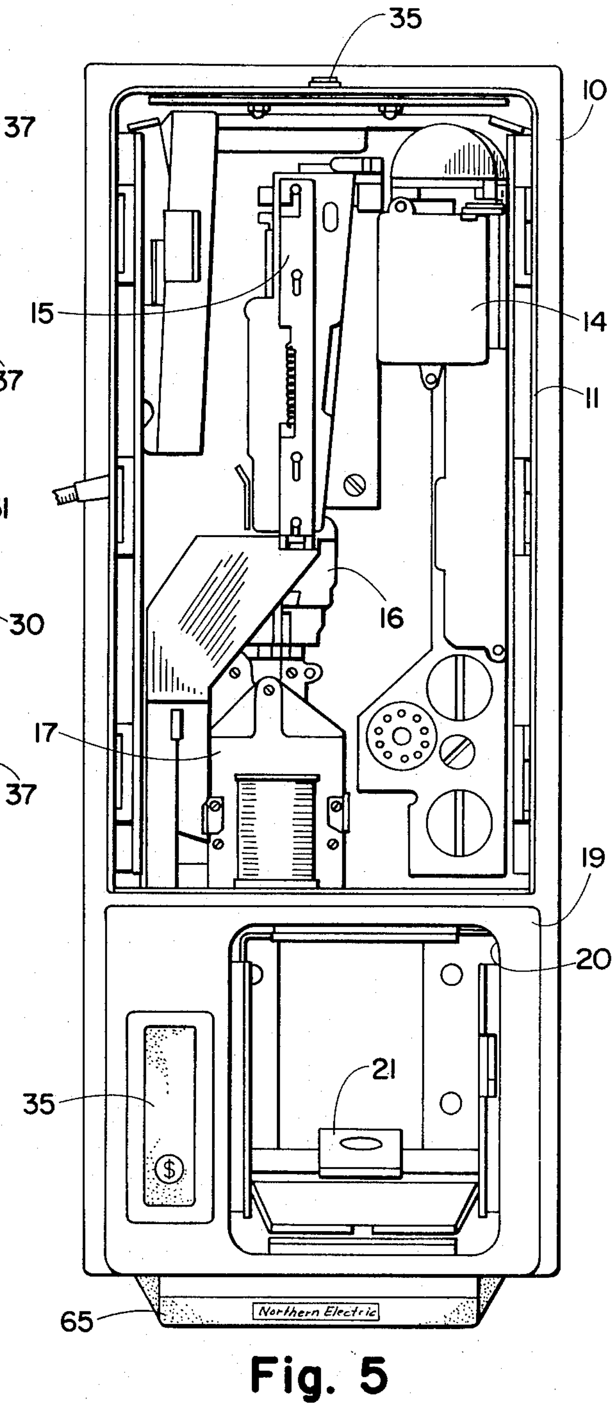
FIG. 5 is a front view of the unit of FIGS. 1, 2 and 3 with the inner cover removed and also the coin receptacle and cover.
Figure 6:
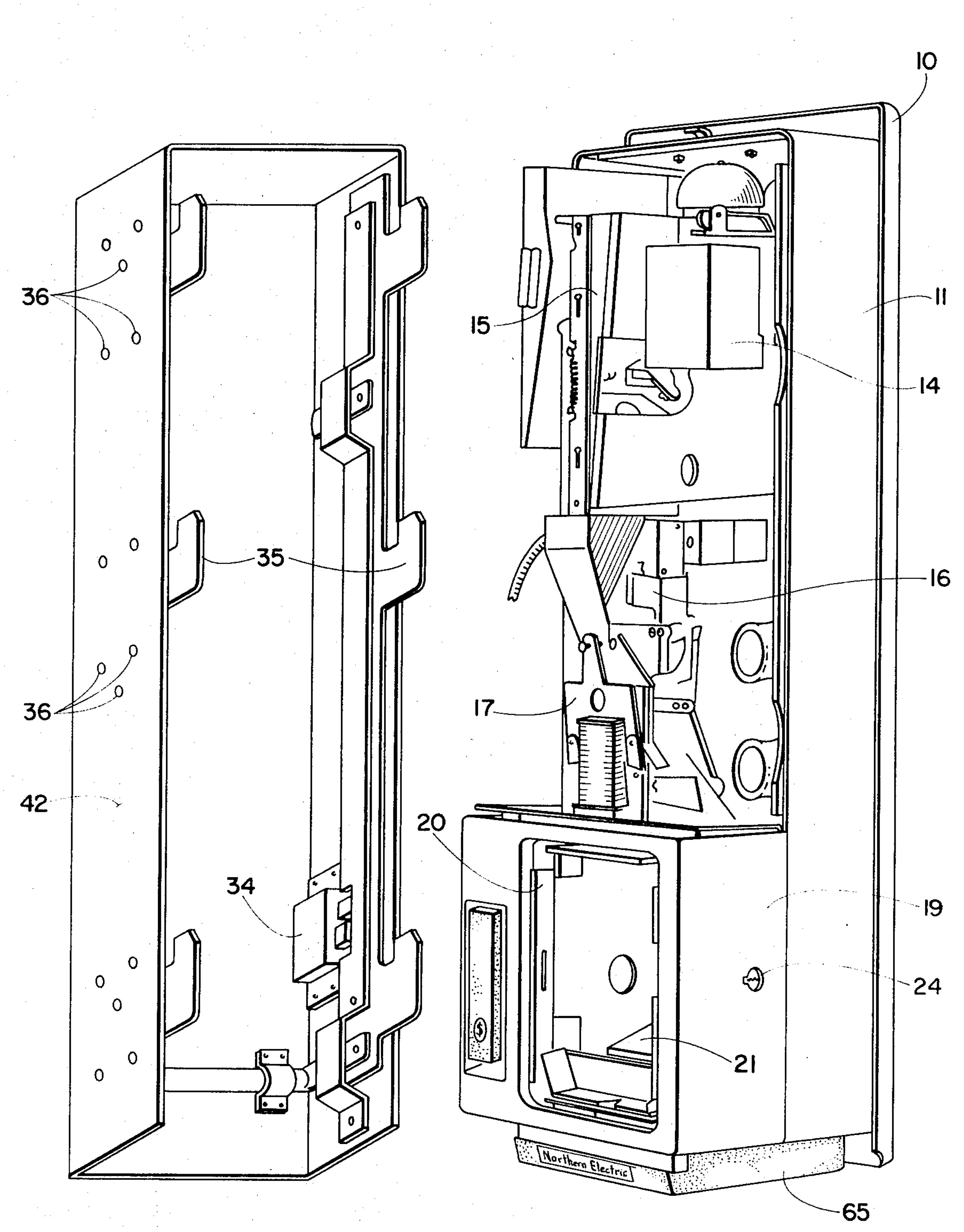
FIG. 6 is a perspective view of the unit with the inner cover removed and positioned at one side.
Figure 7:
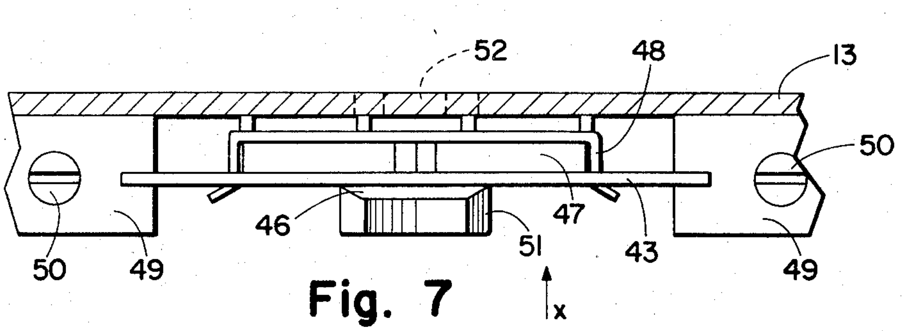
FIG. 7 is a cross-section through the outer cover on the line 7—7 of FIG. 3, to a larger scale, showing the outer cover lock.
Figure 8:
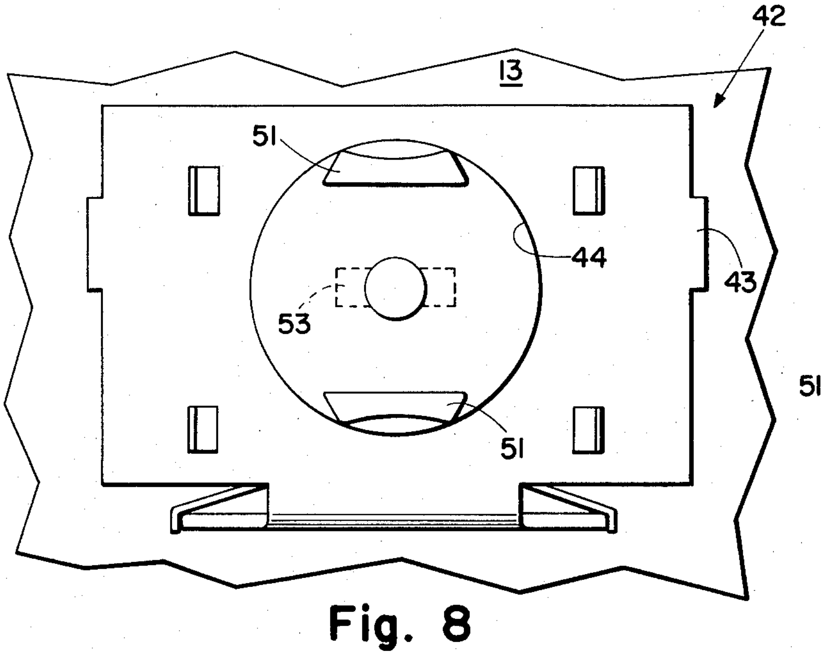
FIG. 8 is a view of the lock in the direction of arrow X in FIG. 7.
Figure 9:
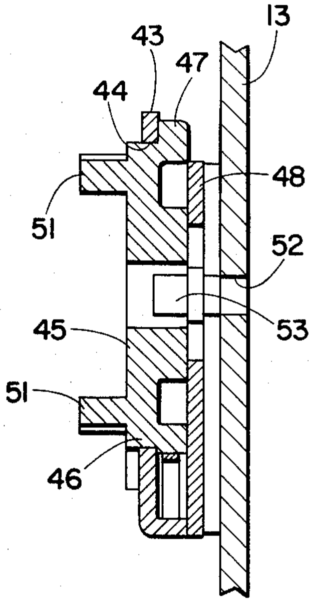
FIG. 9 is a cross-section on the line IX—IX of FIG. 8.

Lock 42, as seen in FIGS. 7, 8 and 9 comprises a flat plate 43 having a central aperture 44. Rotatable in the aperture 44 is an engaging member 45 having a cylindrical portion 46, which is a close rotating fit in the aperture 44, and an enlarged flange 47. The flange 47 rests on the flat plate 43 and is held in contact therewith by a retaining plate 48. The lock 42 is held in position against the top of the outer cover 13 by clips 49 which are held by screws 50 which screw into threaded ribs on the outer cover. The engaging member has two ribs 51 extending from the cylindrical portion 46 in a direction away from the flange 47. The engaging member is rotated by a key inserted through an aperture 52 in the outer cover 13, the key having a T shaped end which fits into a similarly shaped slot 53 formed in the engaging member.

Figure 10:
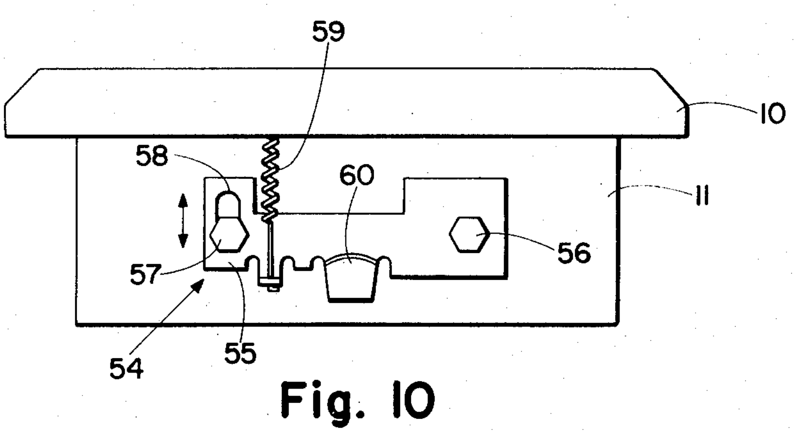
FIG. 10 is a top view of the housing.

The ribs 51 engage with a lock member 54 mounted on the top surface of the housing 11, seen in FIG. 10.

In the particular example only one of the ribs 51 engages with the lock member 54. As seen in FIG. 10 the lock member 54 comprises a flat plate-like portion 55 which is held onto the top surface of the housing 11 by two screws 56 and 57. Screw 56 passes through a clearance hole in the portion 55 and the lock member 54 can pivot on the screw. Screw 57 passes through a slot 58 in the portion 55, the slot serving to limit pivoting of the lock member. A tension spring 59 acts to pull the lock member 54 towards the back of the housing. At the edge of the portion 55 remote from the back of the housing a curved lip or rib member 60 is formed, extending upward from the portion 55. When the outer cover is put in position, rotation of the engaging member 45 causes one of the two ribs 51 to engage behind the lip or rib member 50. Indents are formed on the flange 47 of the engaging member 45 to give positive indication of a locking position. The pivoting ability of the lock member 54 provides for variations in dimensions in the housing 11 and in the outer cover, thus avoiding uneconomic manufacturing limits. This is particularly useful for the housing which is a substantial pressing and therefore liable to some variations in overall dimensions. Similarly with a moulded or stamped outer cover some small variations in finished size can occur.

As a security factor, it is arranged that the cover will not go on with the engaging member 45 in a locked position. Also, it is not possible to withdraw the operating key with the engaging member in the unlocked position. Thus it is not possible for the cover to be put on and left unlocked.

A moveable foot portion 65, can be provided. By making the position of the foot portion adjustable it can act as a locator for the outer cover. Conveniently it can also serve as a carrying handle.

As an alternative form of construction, the housing 11, and also the inner cover 12, can be manufactured from extrusions. In such a construction, the extrusions would be of a cross-section suitable for the housing, or inner cover, and after cutting to length top and bottom members would be attached, for example by welding.

What is claimed is:

1. A prepay coin telephone unit comprising:

a housing of heavy gauge steel;

an extension at the lower end of said housing, said extension extending forward of said housing and forming a box-like enclosure, the remainder of said housing having a forward facing peripheral edge;

an inner cover of heavy gauge steel, including a rear peripheral edge extending along the sides and top of the inner cover and in close fitting engagement with said forward facing peripheral edge of said housing, the lower edge of the inner cover in close fitting engagement with said extension;

a latch mechanism retaining said inner cover on said housing, said latch mechanism comprising; a vertically slidable latch member on each side of said inner cover, transverse connecting means connecting said latch members for simultaneous movement of said members, and formations on said latch members engaging with formations on said housing; and actuating mechanism on one side of said inner cover to actuate said latch members, and to lock said latch members in a latching position;

an outer cover of unitary construction attached to and in close fitting engagement with said housing and said inner cover, said outer cover of lightweight construction and presenting a cosmetically attractive outer surface;

latch means for releasably securing the outer cover of said housing;

a telephone dial mounted on said inner cover and extending through an aperture in said outer cover;

a telephone hook mounted on said inner cover and extending through an aperture in said outer cover;

a coin inlet and a coin return button mounted on said inner cover and extending through said outer cover.

2. A prepay coin telephone unit as claimed in claim 1, said latch means releasably securing the outer cover comprising:

a flat support plate having a central aperture;

means attaching said support plate to the inner surface of said outer cover at a top portion thereof;

an engaging member rotatably supported in said support plate and having a surface facing away from said inner surface of the outer cover;

at least one rib extending from said surface of the engaging member;

a slot formed in said engaging member for rotation of the engaging member, and an aperture in the outer cover for insertion of a key into said slot;

a lock member mounted on a top surface of said housing, said lock member including an upwardly extending rib member and positioned for engagement by said rib extending from said engaging member to retain said outer cover in position over said inner cover and housing.

3. A prepay coin telephone as claimed in claim 2, said lock member comprising a flat portion including a hole at one end of the portion and a slot at the other end of the portion, said lock member pivotally mounted on the top surface of the housing by a screw in said hole, and by a screw passing through said slot, said slot limiting pivotal movement of the lock member, the arrangement such that said upwardly extending rib member is moveable substantially in a line normal to the front face of said housing; and a spring resiliently urging said lock member to a pivotal position to move said upwardly extending rib member away from said front face of the housing.

* * * * *